(12) United States Patent
Lee et al.

(10) Patent No.: US 8,855,398 B2
(45) Date of Patent: Oct. 7, 2014

(54) METHOD OF IDENTIFYING A COUNTERFEIT BILL USING A PORTABLE TERMINAL

(75) Inventors: Dong-Hyuk Lee, Seoul (KR); Jung-Kee Lee, Gyeonggi-do (KR); Seong-Taek Hwang, Gyeonggi-do (KR); Do-Hyeon Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 240 days.

(21) Appl. No.: 13/564,347

(22) Filed: Aug. 1, 2012

(65) Prior Publication Data

US 2013/0034290 A1 Feb. 7, 2013

(30) Foreign Application Priority Data

Aug. 1, 2011 (KR) .................. 10-2011-0076667

(51) Int. Cl.
*G06K 9/00* (2006.01)
*G07D 7/20* (2006.01)
*G06K 9/20* (2006.01)
*G07D 7/12* (2006.01)

(52) U.S. Cl.
CPC ............ *G06K 9/2018* (2013.01); *G07D 7/2025* (2013.01); *G07D 7/12* (2013.01)
USPC ........................................................ 382/135

(58) Field of Classification Search
CPC ..... G06K 9/2018; G07D 7/12; G07D 7/2025; G07D 7/2058
USPC .......................................................... 382/135
See application file for complete search history.

(56) References Cited

U.S. PATENT DOCUMENTS

| 6,141,438 | A  | * | 10/2000 | Blanchester ................. | 382/140 |
| 6,883,707 | B2 | * | 4/2005 | Nagasaka et al. ............. | 235/379 |
| 7,221,930 | B2 | * | 5/2007 | Tsai et al. ..................... | 455/410 |
| 8,437,532 | B1 | * | 5/2013 | Jones et al. .................... | 382/138 |
| 2006/0228025 | A1 | * | 10/2006 | Yu et al. ........................ | 382/181 |
| 2012/0235785 | A1 | * | 9/2012 | Alberth et al. ................. | 340/5.8 |

FOREIGN PATENT DOCUMENTS

KR 100962607 6/2010

* cited by examiner

*Primary Examiner* — Tom Y Lu
(74) *Attorney, Agent, or Firm* — The Farrell Law Firm, P.C.

(57) ABSTRACT

A method and a portable terminal for identifying a counterfeit bill. The method includes receiving, by the portable terminal, an image of a bill photographed using visible rays and an image of the bill photographed using infrared rays; determining a denomination of the bill by comparing the image photographed using the visible rays with a denomination database; obtaining correction information for making the image photographed using the visible rays correspond to a corresponding bill image in the denomination database; forming a corrected image by correcting the image photographed using the infrared rays using the correction information; binary-coding the corrected image; and determining whether the bill is counterfeit by comparing the binary-coded corrected image with an image of the corresponding bill pre-stored in a genuine bill database.

20 Claims, 9 Drawing Sheets

METHOD OF IDENTIFYING A COUNTERFEIT BILL USING A PORTABLE TERMINAL

PRIORITY

This application claims priority under 35 U.S.C. §119(a) to Korean Patent Application Serial No. 10-2011-0076667, which was filed in the Korean Industrial Property Office on Aug. 1, 2011, the content of which is incorporated herein by reference.

BACKGROUND OF THE INVENTION

1. Field of the Invention

The present invention relates generally to a method and a portable terminal for identifying a counterfeit bill, and more particularly, to a method and a portable terminal for identifying a counterfeit bill using infrared rays.

2. Description of the Related Art

Conventional methods or apparatuses for identifying counterfeit bills often utilize ultraviolet rays, magnetic components, or infrared rays. However, the conventional methods or apparatuses are generally expensive.

Further, although research is being performed for identifying a counterfeit bill using a mobile infrared ray camera, the mobile infrared ray camera is highly influenced by photographing motion or a neighboring environment of a user.

For example, when a photographed image of a bill is obtained through the mobile infrared ray camera, there is a strong possibility that information on the bill image of the obtained photographed image is poor, based on hand shakiness of a user, a lens characteristic, and/or a neighboring light environment based on a photographing position.

SUMMARY OF THE INVENTION

Accordingly, an aspect of the present invention is to solve the above-stated problems occurring in the prior art and to provide at least the advantages described below.

An aspect of the present invention is to provide a method and a portable terminal for identifying a counterfeit bill, which suppresses influences from a photographing motion and/or a neighboring environment of a user by simultaneously using visible rays and infrared rays.

In accordance with an aspect of the present invention, a method for identifying a counterfeit bill is provided. The method includes receiving, by the portable terminal, an image of a bill photographed using visible rays and an image of the bill photographed using infrared rays; determining a denomination of the bill by comparing the image photographed using the visible rays with a denomination database; obtaining correction information for making the image photographed using the visible rays correspond to a corresponding bill image in the denomination database; forming a corrected image by correcting the image photographed using the infrared rays using the correction information; binary-coding the corrected image; and determining whether the bill is counterfeit by comparing the binary-coded corrected image with an image of the corresponding bill pre-stored in a genuine bill database.

In accordance with another aspect of the present invention, a portable terminal for identifying a counterfeit bill is provided. The portable terminal includes a camera for receiving an image of a bill photographed using visible rays and an image of the bill photographed using infrared rays; a memory for storing a denomination database and a genuine bill database for the bill; and a controller for determining a denomination of the bill by comparing the image photographed using the visible rays with a denomination database, obtaining correction information for making the image photographed using the visible rays correspond to a corresponding bill image in the denomination database, forming a corrected image by correcting the image photographed using the infrared rays using the correction information, binary-coding the corrected image, and determining whether the bill is counterfeit by comparing the binary-coded corrected image with an image of the corresponding bill stored in the genuine bill database.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Figure 1:
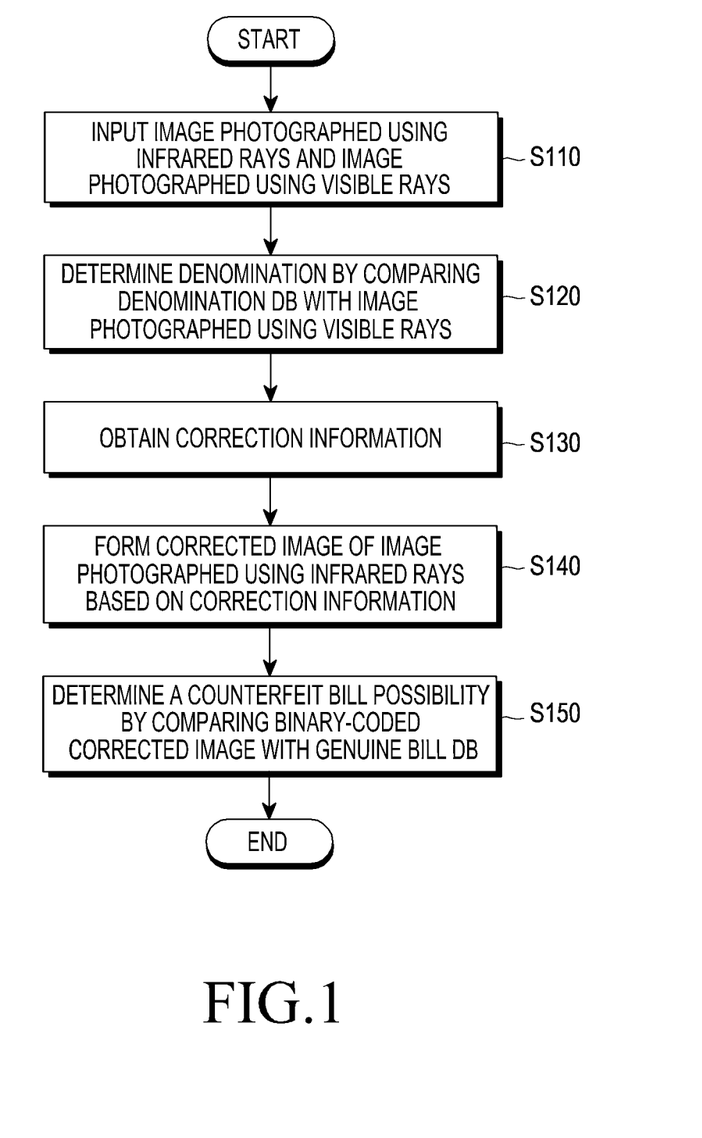
FIG. 1 is a flowchart illustrating a method for identifying a counterfeit bill according to an embodiment of the present invention.

FIG. 1 is a flowchart illustrating a method for identifying a counterfeit bill in a portable terminal according to an embodiment of the present invention. Specifically, the portable terminal includes a light receiving device and an infrared ray irradiation device, such as a camera. For example, the portable terminal may be embodied as a mobile phone or a smart phone including a camera.

Referring to FIG. 1, in step S110, the portable terminal receives an image photographed using infrared rays, and an image photographed using visible rays.

For example, the portable terminal may execute a counterfeit bill identification mode according to an operation of a user, and when the portable terminal enters the counterfeit bill identification mode, the portable may irradiates infrared rays toward the bill. Here, the infrared rays are electromagnetic waves of a wavelength band of approximately 760 nm to 50,000 nm. For example, the portable terminal includes a GaAs semiconductor laser of a wavelength of 830 nm, a Nd-YAG or Nd glass laser of a wavelength of 1,300 or 1,060 nm, an HF laser of a wavelength of 2,800 nm, a CO laser of a wavelength of 5,000 nm, a $CO_2$ laser of a wavelength of 10,600 nm, an SF6 laser of a wavelength of 16,000 nm, or a far-infrared laser in the unit of several tens to several hundreds of m. Accordingly, the portable terminal may irradiate infrared rays corresponding to various wavelengths to the bill.

The portable terminal receives an image of the bill photographed using infrared rays reflected from the bill and an image of the bill photographed using visible rays reflected by natural light by using a light receiving means, such as a camera. Here, the light receiving device may receive electromagnetic waves of a wavelength band of visible rays and the infrared rays.

The portable terminal may sequentially or simultaneously receive the image photographed using the visible rays and the image photographed using the infrared rays. Further, the portable terminal may include a visible ray cut filter and an infrared ray cut filter.

When the portable terminal receives a photographing instruction from a user, the visible rays cut filter and the infrared rays cut filter may sequentially suppress incident light through the light receiving device while having a predetermined time interval, respectively. Here, the predetermined time interval may be an extremely short time, and thus, the portable terminal basically receives the image photographed using the visible rays and the image photographed using the infrared rays simultaneously.

Further, the visible ray cut filter and the infrared ray cut filter may be connected to a high-speed motor, thereby being capable of suppressing the light incident through the light receiving means while having a short time interval.

Figure 2A:
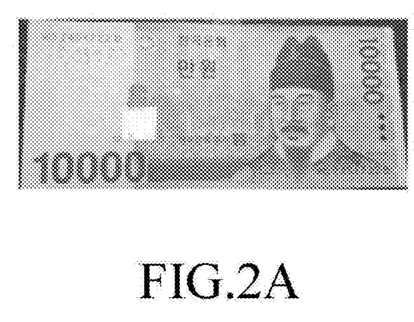
FIGS. 2A and 2B are images of a Korean, ten thousand-won bill, which is photographed using visible rays and infrared rays, respectively, according to an embodiment of the present invention.
Figure 2B:
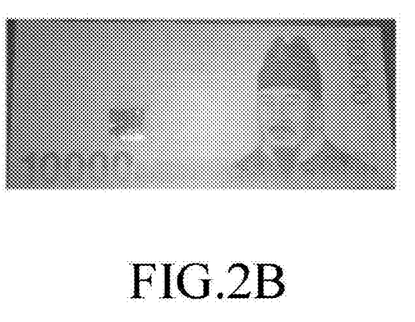

FIGS. 2A and 2B are images of a Korean, ten thousand-won bill, which is photographed using visible rays and infrared rays, respectively, according to an embodiment of the present invention.

As illustrated in FIGS. 2A and 2B, the images photographed using the visible rays and the infrared rays with the short time interval have the same orientation.

Accordingly, when the portable terminal receives the image photographed using the visible rays and the image photographed using the infrared rays in step S110, the portable terminal may first perform a correction on the photographed images by using the image photographed using the visible rays.

In step S120, the portable terminal may identifies a denomination of the photographed bill by comparing the image photographed using the visible rays with an embedded denomination database including a plurality of bill images. For example, the portable terminal identifies a denomination of the bill by extracting a characteristic of the bill from the image photographed using the visible rays and comparing the extracted characteristic of the bill with bill characteristics of the bills included in the denomination database.

The characteristic of the bill, which may also be called a "characteristic point," includes at least one of a corner point, an edge, and a blob included in the image photographed using the visible rays.

The edge is formed with dots configuring a boundary line of a region including a difference of pixel values. That is, the edge may be formed with a set of dots having a value, other than "0", of a first-order partial derivative of the photographed image. For example, the edge is obtained by calculating the partial derivative for the image photographed using the visible rays and using the obtained value of the partial derivative.

The corner point may be formed with a set of dots having an extremum of the photographed image, and the dots include a dot having "0" as a value of a first-order partial derivative of the photographed image and simultaneously not-having "0" as a value of a second-order partial derivative of the photographed image. Further, a point, on which a differential cannot be performed, of the photographed image is considered as the extremum, so that the point may be determined as the corner point. The corner point may be obtained as an inherent value of the Hessian matrix introduced according to Harris corner detection. The entire Hessian matrix may include the second-order partial derivative of a continuous function.

The blob refers to a region of which a pixel value is larger or smaller than that of a neighboring region. The blob may be obtained using the Laplacain or the Laplace operator of a second-order partial derivative for each dimension (an x-dimension and an y-dimension) of the image photographed using the visible rays.

For example, the characteristics of a bill may be obtained through a Scale Invariant Feature Transform (SIFT) scheme or a Speeded Up Robust Feature (SURF) scheme. An SIFT algorithm searches for a characteristic point in a Gaussian scale space and has an advantage that it is possible to extract a characteristic point less influenced from a scale change. The SURF scheme is implemented by obtaining a sum of pixel values corresponding to the inside of a quadrangular filter by repeating a convolution of the image using the quadrangular filter in order to extract the characteristic point. As a detailed description of the SIFT algorithm or the SURF scheme is not essential for the description of the present invention, neither is provided herein.

Accordingly, the portable terminal identifies the denomination of the photographed bill in step S120 by comparing the characteristic of the bill obtained through the above-described process with the pre-stored bill characteristics in the denomination database.

For example, when the portable terminal uses at least one of a corner point, an edge, and a blob, or a descriptor described with at least one of the corner point, the edge, and the blob of the image photographed using the visible rays as the characteristic of the bill, the portable terminal may also perform a matching by using the same bill characteristic stored in the denomination database, as that used for the image photographed using the visible rays.

Figure 3A:
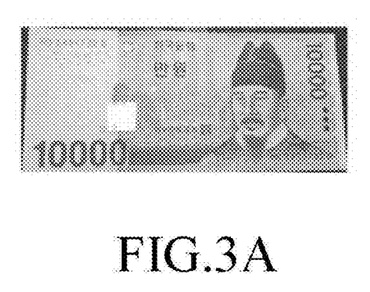
FIG. 3A is an image photographed using visible rays before correction, according to an embodiment of the present invention.
Figure 3B:
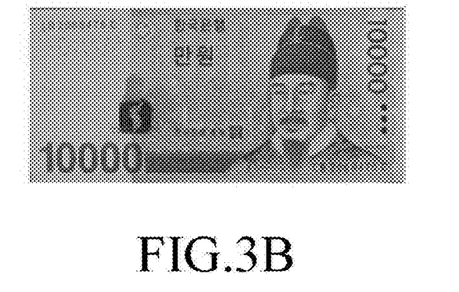
FIG. 3B is an image included in a denomination database corresponding to the image photographed using the visible rays of FIG. 3A, according to an embodiment of the present invention.

FIG. 3A is an image photographed using visible rays before correction and FIG. 3B is a denomination stored in the denomination database corresponding to the image photographed using the visible rays of FIG. 3A.

The portable terminal may obtain the correction information for the image photographed using the visible rays based on a position relation between the bill characteristic of the image photographed using the visible rays and the corresponding bill characteristic of the denomination database.

Figure 4:
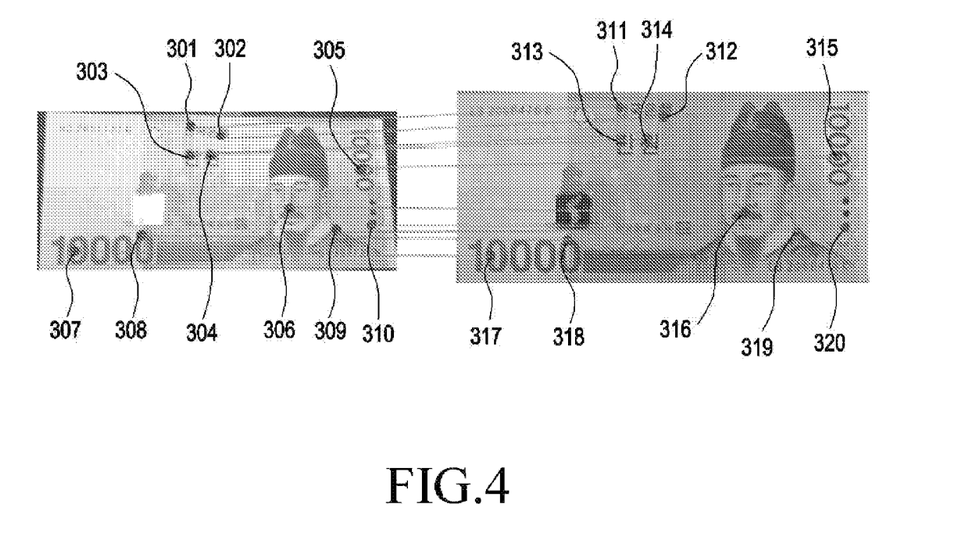
FIG. 4 illustrates a characteristic matching process between the images of FIGS. 3A and 3B, according to an embodiment of the present invention.

FIG. 4 illustrates a characteristic matching process between the images of FIGS. 3A and 3B, according to an embodiment of the present invention. Referring to FIG. 4, the image photographed using the visible rays in FIG. 3A and the corresponding image in the denomination database in FIG. 3B include bill characteristics 301 through 320.

The portable terminal matches the bill characteristics 301 to 310 of the image photographed using the visible rays to the bill characteristics 311 to 320 of a ten thousand-won bill denomination database of the denomination database. When the matching is equal to or larger than a preset ratio, the portable terminal determines the image photographed using the visible rays as a corresponding denomination.

After the portable terminal determines the denomination of the bill in step S120, the portable terminal obtains correction information in step S130, which is used to make the bill image in FIG. 3A appear more identical to that the image stored in the denomination database, i.e., FIG. 3B. For example, the correction information includes information for matching a shape of the image photographed using visible rays to a shape of the denomination database to be the same.

Additionally, the portable terminal may obtain the correction information such that the image photographed using the visible rays corresponds to the bill characteristic stored in the denomination database, based on a result of a homography calculation. Homography is a type of linear projective transformation for two images. Accordingly, the portable terminal obtains a homography matrix related to a relation between conjugate pairs by making the conjugate pairs of coordinates (or pixel information) of the obtained bill characteristics and coordinates (or pixel information) of the bill characteristics stored in the denomination database. Equation (1) represents a homography matrix and a relationship between conjugate pairs.

$$\begin{bmatrix} x' \\ y' \\ 1 \end{bmatrix} = \begin{bmatrix} h_{11} & h_{12} & h_{13} \\ h_{21} & h_{22} & h_{23} \\ h_{31} & h_{32} & h_{33} \end{bmatrix} \begin{bmatrix} x \\ y \\ 1 \end{bmatrix}, \quad (1)$$

In Equation (1), h represents a homography matrix element, i.e., a transformation parameter, (x,y) represents the bill characteristic, the coordinates of the characteristic point, or the pixel information on the image photographed using the visible rays, and (x', y') represents the bill characteristic, the coordinates of the characteristic point, or the pixel information of the denomination database.

Equation (1) can be re-written as shown in Equation (2), where x' and y' indicate the coordinates of the characteristic point, or the information of the denomination database.

$$x' = \frac{h_{11}x + h_{12}y + h_{13}}{h_{31}x + h_{32}y + h_{33}}. \quad (2)$$

$$y' = \frac{h_{211}x + h_{22}y + h_{23}}{h_{31}x + h_{32}y + h_{33}}$$

The portable terminal obtains the correction information indicating a degree of increase, decrease, rotation, affine, and perspective required for making the characteristics of the image photographed using the visible rays correspond to the bill characteristics of the image in the denomination database by obtaining the homography matrix through the aforementioned scheme.

In step S140, the portable terminal then constructs a corrected image by correcting the image photographed using the infrared rays, based on the obtained correction information.

For example, the portable terminal obtains the corrected image of the image photographed using the infrared rays by applying the homography matrix obtained from the image photographed using the visible rays to the image photographed using the infrared rays.

Through the application of the homography matrix obtained from the image photographed using the visible rays to the image photographed using the infrared rays, the image photographed using the infrared rays preferably has the same size and arrangement state as those of the denomination database.

Figure 5A:
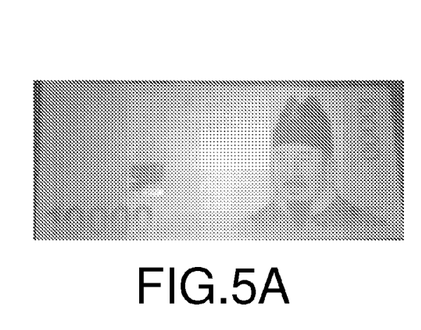
FIG. 5A is an image photographed using infrared rays, according to an embodiment of the present invention.
Figure 5B:
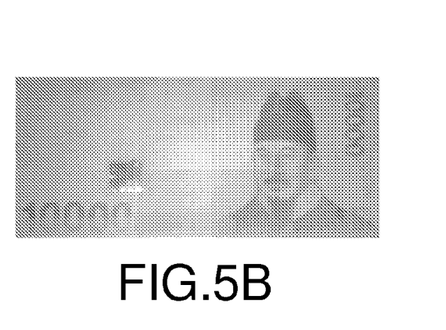
FIG. 5B is a corrected image obtained by applying a homographic matrix obtained from a relation between FIGS. 4A and 4B to the image photographed using infrared rays of FIG. 5A, according to an embodiment of the present invention.

FIG. 5A is an image photographed using the infrared rays and FIG. 5B is a corrected image obtained by applying the homographic matrix obtained from the relation between FIGS. 3A and 3B to the image photographed using infrared rays of FIG. 5A, according to an embodiment of the present invention. The image in the denomination database in FIG. 3B and the corrected image in FIG. 5B preferably have the same size and/or arrangement form.

As described above, the portable terminal corrects the image photographed using the infrared rays by using the correction information obtained from the image photographed using the visible rays, in order to correct the photographed image that is distorted due to a photographing motion, e.g., hand shakiness, through a simple algorithm.

In step S150, the portable terminal performs binary-coding on the constructed corrected image, and determines a counterfeiting possibility by comparing the binary-coded corrected image with a pre-stored genuine bill image stored in the database.

More particularly, the portable terminal determines the counterfeiting possibility by overlapping the binary-coded corrected image and the genuine bill image from database, and identifies the bill as a genuine bill, when a degree of a correspondence between the two images is greater than or equal to a preset value, and identifies the bill as a counterfeit bill, when the degree of the correspondence between the two images is smaller than the preset value.

The genuine bill database may be frequently updated.

In accordance with an embodiment of the present invention, the portable terminal detects a size value of pixels of each image photographed using the infrared rays using a Sobel edge detection method, etc., in order to extract a characteristic value from the input image photographed using the infrared rays. The portable terminal detects an edge as an example of the characteristic value of the image photographed using the infrared rays, based on the detected size value.

The edge may be a predetermined shape or a boundary of a region in the image photographed using the infrared rays, and the portable terminal searches for discontinuous dots of pixel brightness in order to detect the edge.

In order to detect the edge, the portable terminal obtains a gradient of the image photographed using the infrared rays. Basically, the edge exists in a part in which a brightness value of the image photographed using the infrared rays is sharply changed. Accordingly, a region having a large gradient is determined as the edge.

The Sobel operator may be related to a first-order gradient among gradients of the image photographed using the infrared rays. Equation (3) represents a 2-Dimensional (2D) gradient at a predetermined pixel (x, y) in a 2D image.

$$\nabla I = \begin{bmatrix} \nabla_x \\ \nabla_y \end{bmatrix} = \begin{bmatrix} \frac{\partial I}{\partial x} \\ \frac{\partial I}{\partial y} \end{bmatrix} \quad (3)$$

In Equation (3), a gradient vector in the predetermined pixel (x, y) represents a maximum change ratio direction of I. An important value in the edge detection is an absolute value of the vector, which is by Equation (4).

$$\nabla I = \text{mag}(\nabla I) = [\nabla_x^2 - \nabla_y^2]^{1/2} \quad (4)$$

A differential may be implemented in a digital form of Equation (5), based on Equations (3) and (4).

$$\nabla I(m,n) = \text{mag}(\nabla I(m,n)) = [\nabla_x^2(m,n) + \nabla_y^2(m,n)]^{1/2}$$

or $|\nabla_x(m,n) + \nabla_y(m,n)|$  (5)

In Equation (5), (m,n) represent positions in vertical and horizontal directions within the image, as represented by Equation (6).

$$\nabla_x(m,n) = I(m-1,n) - I(m,n)$$

or $I(m,n) - I(m-1,n)$ or $I(m-1,n) - I(m-1,n)$  (6)

Because the Sobel edge detection method provides both an image difference and a planarization effect by using a sort of the gradient operator, it is possible to reduce noise, thus, suppressing noise from an outside environment, e.g., lighting.

Each mask used in the Sobel edge detection method may be represented by Equations (7) and (8) below.

$$\nabla_x(m,n) = [I(m-1,n+1) + 2I(m+1,n) + I(m+1,n-1)] - \quad (7)$$
$$[I(m-1,n+1) + 2I(m-1,n) + I(m-1,n-1)]$$

$$\nabla_y(m,n) = [I(m+1,n+1) + 2I(m,n+1) + I(m-1,n+1)] - \quad (8)$$
$$[I(m-1,n-1) + 2I(m,n-1) + I(m-1,n-1)]$$

As described above, the portable terminal obtains the size value representing the edge indicating a predetermined region or a contour of a shape in the image photographed using the infrared rays.

Additionally, the portable terminal may obtain a threshold value that makes a maximum distribution in a histogram of size values in order to more efficiently suppress influence of a neighboring environment.

Figure 6:
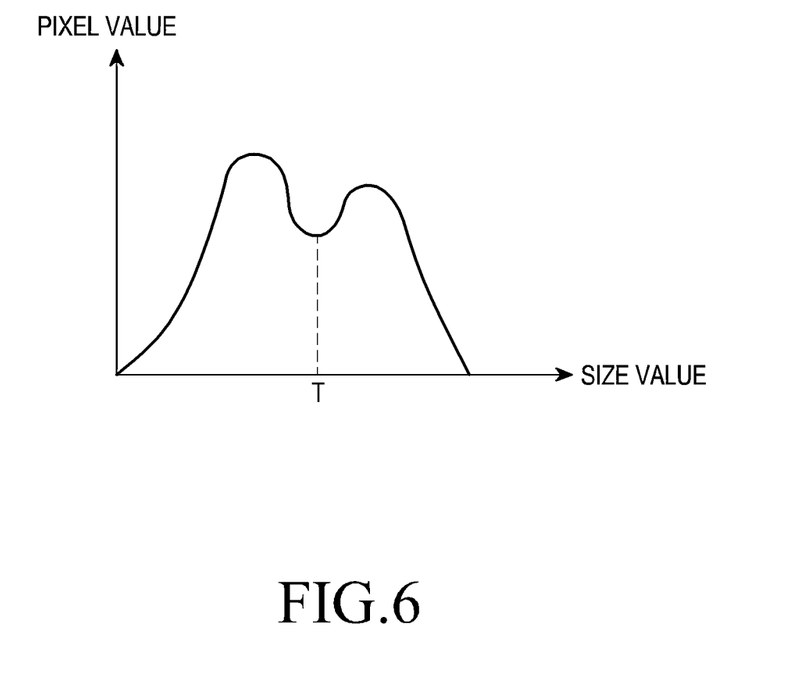
FIG. 6 is a histogram of size values according to an embodiment of the present invention.

FIG. 6 is a histogram of size values according to an embodiment of the present invention.

Referring to FIG. 6, the histogram of the size values is constructed with two peaks, where a trough point is a threshold value. That is, the histogram is divided into two classes, and a size value for the division is set as the threshold value. Here, the entire distribution in the histogram is represented with a sum of a distribution within the class and a distribution between the classes. The distribution within the class may be represented by Equation (9).

$$\sigma_w^2(t) = w1(t)\sigma_1^2(t) + w2(t)\sigma_2^2(t) \quad (9)$$

In Equation (9), w1 and w2 indicate weights. Equation (9) demonstrates that the distribution within the class may be represented with a sum of a multiplication of the distribution of class 1 by weight 1 and a multiplication of the distribution of class 2 by weight 2.

In order to more accurately detect the edge, a threshold is more accurately calculated, and in this respect, both classes are should have a small distribution. That is, if a minimum value of the distribution within the class is obtained, an accurate threshold may be obtained, and the threshold may be found by representing the distribution between the classes, as shown in Equation (10) below.

$$\sigma_b^2(t) = \sigma^2 - \sigma_w^2(t) = w1(t)w2(t)[\mu_1(t) - \mu_2(t)]^2 \quad (10)$$

In Equation (10), μ1 and μ2 indicate an average of each class.

In accordance with an embodiment of the present invention, a portable terminal forms a binary image including display pixels and non-display pixels by calculating a threshold that makes the entire distribution value be a maximum, assigning a value "1" to a pixel having a value greater than or equal to the threshold, and assigning a value "0" to a pixel having a value smaller than the threshold.

Through the aforementioned process, the portable terminal forms the binary image indicating a predetermined region or a contour of a shape in the image photographed using the infrared rays.

Figure 7A:
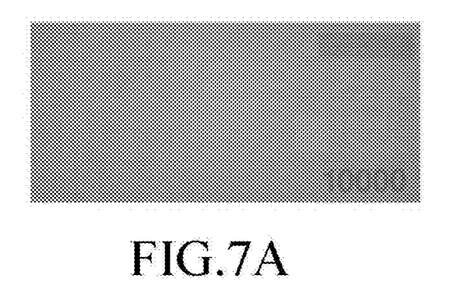
FIGS. 7A to 7F are corrected images of bills of respective countries and corresponding binary-coded corrected images, according to an embodiment of the present invention.
Figure 7B:
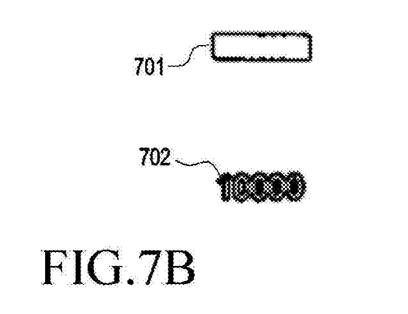
Figure 7C:
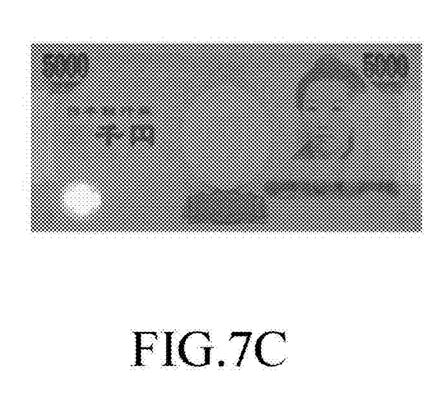
Figure 7D:
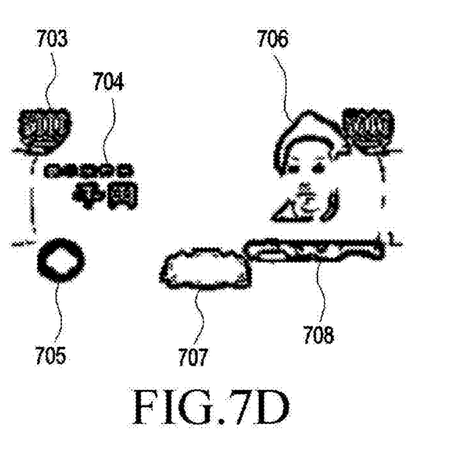
Figure 7E:
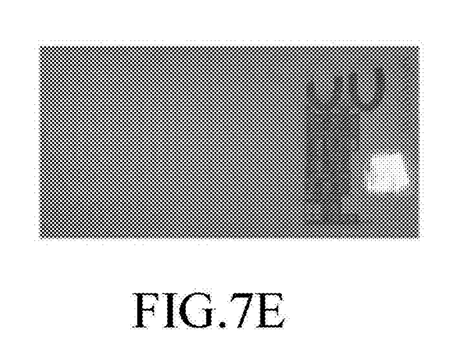
Figure 7F:
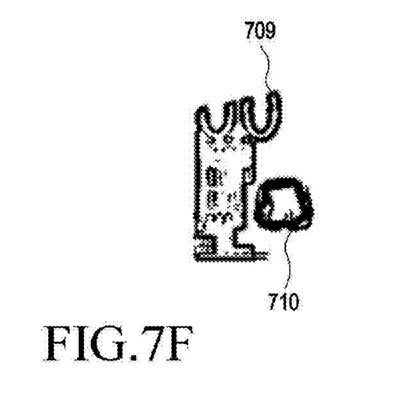

FIGS. 7A and 7F are corrected images and corresponding binary-coded corrected images of bills of different countries according to an embodiment of the present invention.

Specifically, FIGS. 7A and 7B are a corrected image and a binary-coded corrected image of a Korean ten thousand-won bill, respectively.

In FIGS. 7A and 7B, the binary coded image displays a rectangle shape 701 in a right-upper side and a "10000" shape in a right-lower side of the image.

FIGS. 7C and 7D are a corrected image and a binary-coded corrected image of a Japanese five thousand-Yen bill, respectively. In FIGS. 7C and 7D, the binary coded corrected image displays a "5000" shape 703, a predetermined Chinese character shape 704, and a round shape 705 in a left side of the image, and a person shape 706, a shape 708 extended in left and right directions, and a predetermined Chinese character shape 707 in a right side of the image.

FIGS. 7E and 7F are a corrected image and a binary-coded corrected image of five hundred-Euro, respectively. In FIGS. 7E and 7F, the binary coded corrected image displays predetermined shapes 709 and 710 in a right side of the image.

Accordingly, the portable terminal determines whether a bill is counterfeit by comparing the binary-coded corrected image, such as FIGS. 7B, 7D, and 7E, with the characteristics of the corresponding bills in the genuine bill database.

Additionally, the portable terminal may form a region map that applies an edge map for extracting a Chamfer distance for the binary-coded corrected image.

FIGS. 8A to 8D are conceptual diagrams illustrating an area map according to an embodiment of the present invention.

Figure 8A:
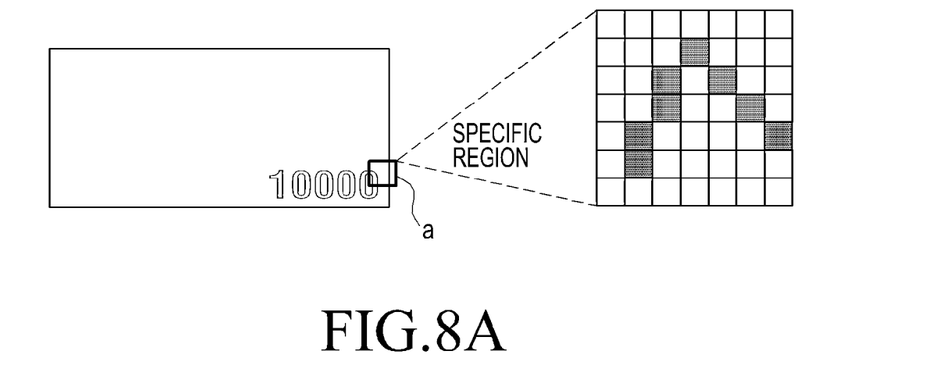
FIGS. 8A to 8D are conceptual diagrams illustrating an area map according to an embodiment of the present invention.

Referring to FIG. 8A, the portable terminal compares a specific region of the binary-coded corrected image with regions included in the genuine bill database by reading from the pre-stored genuine bill database. Here, the specific region may be, for example, a part of "10000".

As illustrated in FIG. 8A, the specific region may be designated as a part, e.g. a part of "10000" in a right-lower side, included in both the genuine bill database and a counterfeit bill database, i.e., a database that stores characteristics of counterfeit bills. The specific region may be designated as 280 to 286×894 to 900 pixels among 300×900 pixels. As illustrated in FIG. 8A, the specific region may include a display pixel and a non-display pixel.

Accordingly, even when the portable terminal does not compare all regions of the binary-coded corrected image with all parts included in the genuine bill database, the portable terminal may form the corrected image by comparing the specific region of the genuine bill database and the specific region of the binary-coded corrected image.

Figure 8B:
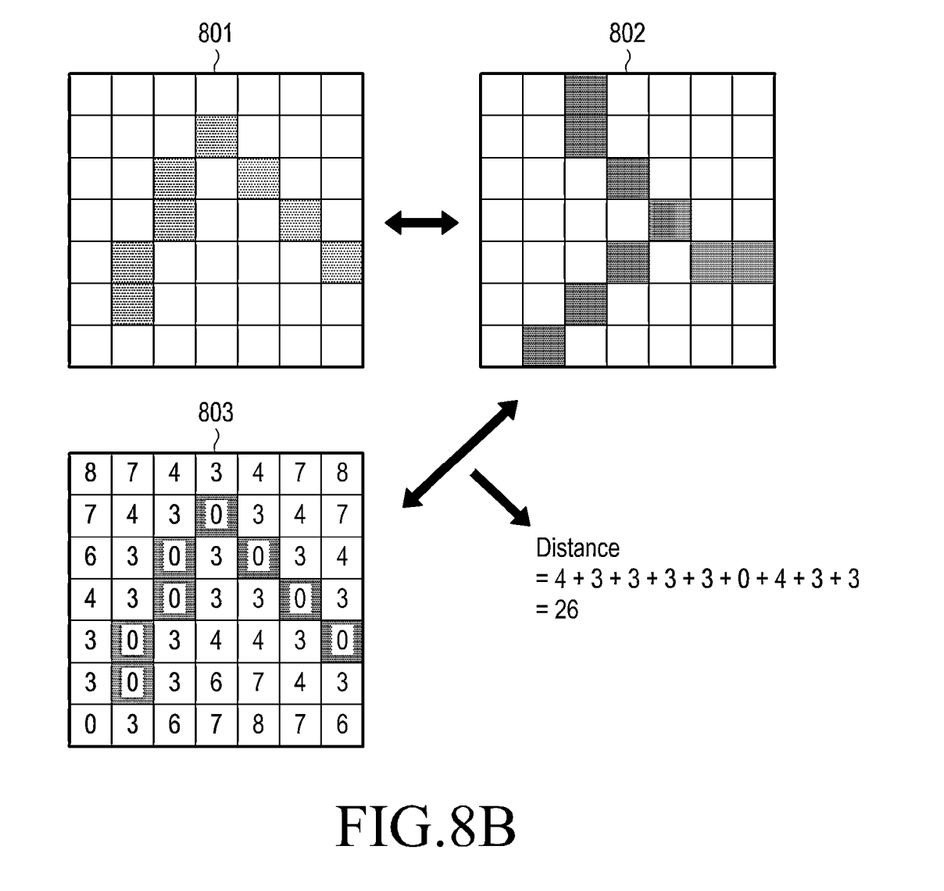

FIG. 8B is a conceptual diagram illustrating a method of comparing the specific region of the genuine bill database and the specific region of the binary-coded corrected image, according to an embodiment of the present invention.

Referring to FIG. 8B, a pixel group indicated by reference number 801 is a pixel group of the specific region of the genuine bill database and has a size of 7×7 pixels. The pixel group 801 of the specific region of the genuine bill database includes display pixels and non-display pixels. A pixel group indicated by reference number 802 is a pixel group of the specific region of the binary-coded corrected image and has a size of 7×7 pixels. The pixel group 802 of the specific region of the binary-coded corrected image also includes display pixels and non-display pixels.

The portable terminal determines a degree of a difference by comparing the pixel group 801 of the specific region of the genuine bill database and the pixel group 802 of the specific region of the binary-coded corrected image. The pixel group 801 of the specific region of the genuine bill database may include a distance value, which indicates a distance from the display pixel and is designated for each pixel, as indicated with reference number 803.

For example, a distance value designated to the display pixels of the pixel group 803 is "0". Further, a distance value of "3" is designated to pixels directly adjacent to the display pixels. Further, a distance value of "4" or "6" is designated to adjacent pixels of the pixels directly adjacent to the display pixels. That is, a distance value is designated to each pixel such that the distance value increases according to an increase of the distance from the display pixel.

Accordingly, the portable terminal sums the distance values of the genuine bill database corresponding to the display pixels of the pixel group 802 of the specific region of the binary-coded corrected image. For example, a (1, 3) pixel of the pixel group 802 of the specific region of the binary-coded corrected image has a distance value "4" and a (2, 3) pixel of the pixel group 802 of the specific region of the binary-coded corrected image has a distance value "3". Accordingly, the sum of the distance values of the entire display pixels of the pixel group 802 of the specific region of the binary-coded corrected image is determined as "26," as illustrated in FIG. 8B. The portable terminal may store the sum, e.g. "26", of the distance values, together with the binary-coded image.

Additionally, the portable terminal may enlarge or reduce the binary-coded image in a predetermined ratio.

Figure 8C:
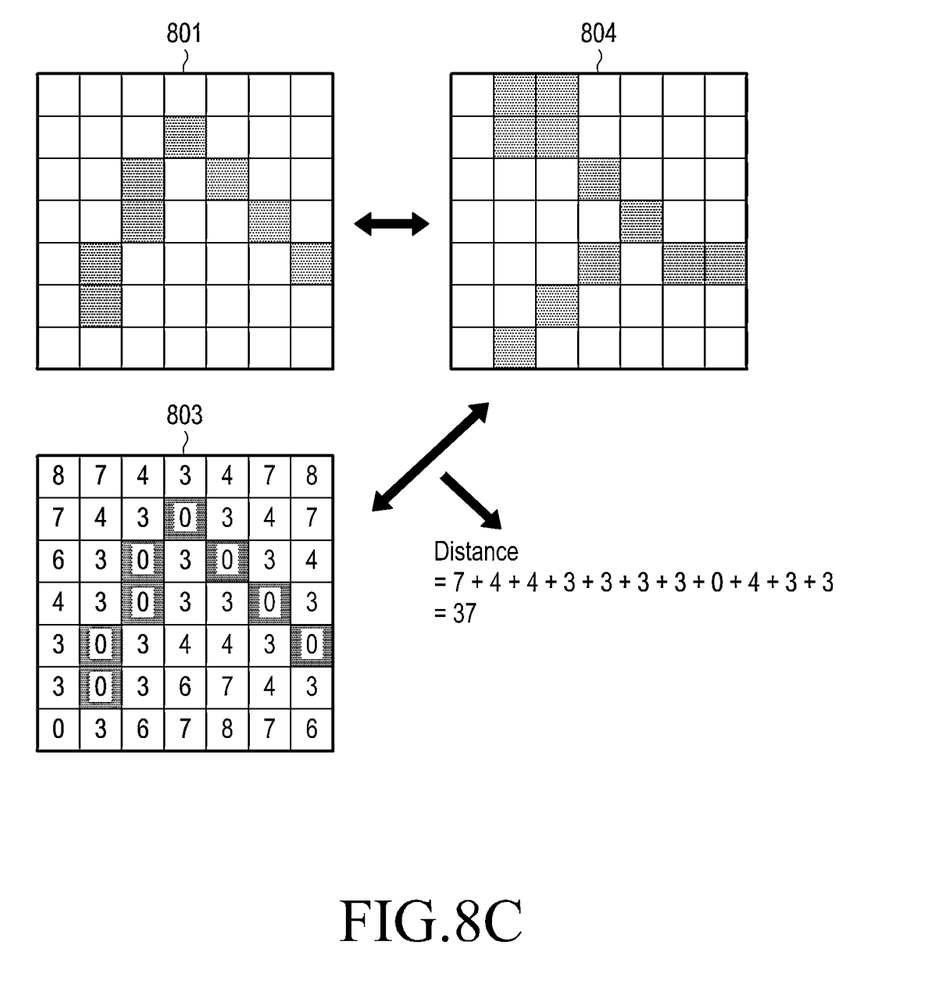

FIG. 8C illustrates a pixel group of the specific region after the binary-coded corrected image is entirely enlarged by a predetermined ratio, according to an embodiment of the present invention.

Referring to FIG. 8C, as denoted by reference number 804, the pixel group of the specific region, after being enlarged by the predetermined ratio, includes display pixels and non-display pixels. Similar to the method of FIG. 8B, the portable terminal calculates a sum of distance values corresponding to the display pixels of the pixel group 804 of the specific region of the enlarged binary-coded corrected image, and the sum is determined as "37".

The portable terminal may store an enlargement ratio and the distance values.

The portable terminal may further enlarge the binary-coded corrected image by a multiple of the predetermined ratio and repeat the above-described process. Further, the portable terminal may reduce the binary-coded corrected image multiple number of times by a multiple of the predetermined ratio and repeat the aforementioned process.

The portable terminal determines the binary-coded corrected image corresponding to a case where the distance value is a minimum value as a corrected image by comparing the calculated sum with the sum of the stored distance values.

Further, the portable terminal may determine the corrected image by moving the binary-coded corrected image in parallel in a direction above, below, to the left, and to the right, as well as by enlarging or reducing the binary-coded corrected image.

Figure 8D:
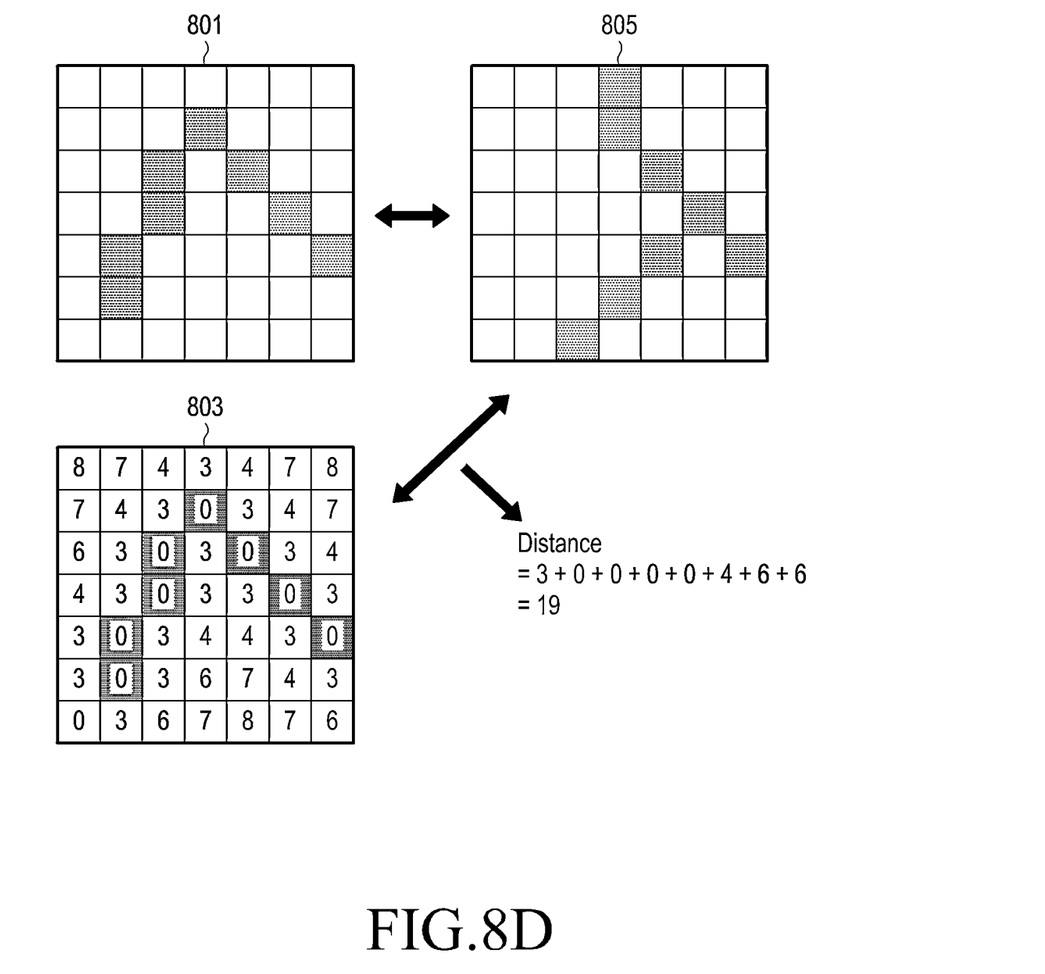

FIG. 8D illustrates a pixel group 805 of the specific region of the binary-coded corrected image after moving the binary-coded corrected image in parallel by one pixel in a right direction. The pixel group 805 includes display pixels and non-display pixels.

The portable terminal calculates a sum of distance values corresponding to the display pixels of the pixel group 805 of the specific region of the enlarged binary-coded corrected image in the same method as described for FIG. 8B. The sum is determined as "19" in FIG. 8D.

Further, the portable terminal may store a movement distance and the sum of the distance values.

The portable terminal may further move the binary-coded corrected image by a multiple of the predetermined distance and repeat the aforementioned process. Further, the portable terminal may move the binary-coded corrected image multiple number of times by a multiple of the predetermined distance in a direction to the above and below or in a direction to the left and the right and repeat the aforementioned process.

The portable terminal may determine the binary-coded corrected image corresponding to a case where the distance value is a minimum value as a target corrected image for comparison by comparing the calculated sum with the sum of the stored distance values.

Although not illustrated, the portable terminal may rotate the binary-coded corrected image by a predetermined angle, and calculate and store a sum of distance values corresponding to the display pixels of the pixel group of the specific region as described above.

Further, the portable terminal may rotate the binary-coded corrected image multiple number of times by a multiple of the predetermined angle, and calculate and store a sum of distance values corresponding to the display pixels of the pixel group of the specific region corresponding to each angle.

The portable terminal may determine the binary-coded corrected image corresponding to a case where the distance value is a minimum value as a target corrected image for comparison by comparing the calculated sum with the sum of the stored distance values.

In the above description, the portable terminal independently rotates, moves, enlarges, or reduces the binary-coded image. However, the portable terminal may determine the corrected image corresponding to a case where the sum of the distance values corresponding to the display pixels of the specific region is a minimum value by performing a combination of the rotation, movement, enlargement, and reduction on the binary-coded image.

When the minimum value of the sum of the distance values corresponding to the display pixels of the specific region is greater than or equal to a threshold, the portable terminal identifies the bill as a counterfeit bill. In this case, the portable terminal calculates a difference between the threshold and the minimum value in order to calculate a value determining a possibility of a counterfeit bill and determines that the possibility of the counterfeit bill is high, as the difference of the threshold and the minimum value is large. That is, once the minimum value is greater than or equal to the threshold, the bill is identified as the counterfeit bill, such that, for example, it may be expressed that the possibility of the counterfeit bill=50+(minimum value−threshold)*weight.

As described above, the portable terminal minimizes influences caused by a photographing motion, e.g., hand shakiness, of the user, thereby more accurately identifying a counterfeit bill.

Figure 9:
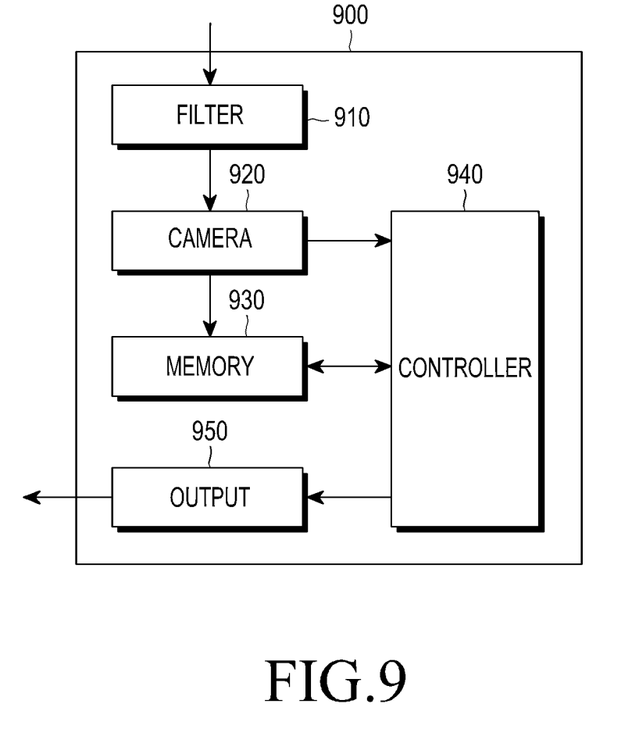
FIG. 9 is a block diagram illustrating a portable terminal according to an embodiment of the present invention.

FIG. 9 is a block diagram illustrating a portable terminal according to an embodiment of the present invention.

Referring to FIG. 9, the portable terminal 900 includes a filter 910, a camera 920, a memory 930, a controller 940, and an output 950.

The filter 910 includes a visible ray cut filter and an infrared ray cut filter. The visible ray cut filter and the infrared cut filter sequentially limit light input to the camera 920.

The camera 920 photographs an image of a bill using visible rays and an image of the bill using infrared rays. The camera 920 may be implemented in a Complementary symmetry Metal-Oxide-Semiconductor (CMOS) module or a Charged Coupled Device (CCD) module.

The memory 930 stores a bill denomination database, a genuine bill database, and/or a counterfeit bill database. Further, as described above, the memory 930 stores a sum of distance values of a specific region of a binary-coded image when correcting the binary-coded corrected image, etc. The memory 930 also stores an algorithm, a program, or an application capable of generally controlling the portable terminal 900. For example, the memory 930 includes a Random Access Memory (RAM), a Read Only Memory (ROM), and an Electrically Erasable Programmable ROM (EEPROM).

The controller 940 determines a denomination of the bill by comparing an image photographed using the visible rays with images of the bill denomination database, obtains correction information making the image photographed using the visible rays correspond to the denomination database, forms a corrected image by correcting the image photographed using the infrared rays by using the correction information, binary-codes the corrected image, and identifies a counterfeit bill by comparing the binary-coded corrected image with images of a genuine bill database.

Further, the controller 940 extracts a bill characteristic from the image photographed using the visible rays and determines the denomination of the bill by comparing the extracted bill characteristic with bill characteristics of the denomination database.

Additionally, the controller 940 may form the binary-coded corrected image by extracting a size value through a Sobel edge detection method.

Further, the controller 940 may determine a characteristic value that makes a distribution value be a maximum value in a histogram of the size values determined by the Sobel edge detection method and form the binary-coded corrected image using the characteristic value.

Further, the controller 940 may obtain the correction information such that the image photographed using the visible rays corresponds to the image of the denomination database, based on a result of a homography calculation, as described above.

The controller 940, may be implemented in a microprocessor, a minicomputer, etc.

The output 950 outputs the possibility of the counterfeit bill, thereby enabling the user to identify the counterfeit bill. The output 950 may be a Liquid Crystal Display (LCD), a speaker, a Light Emitting Diode (LED) indicator, etc.

Although not illustrated the portable terminal 900 further includes an infrared ray irradiation device, which is controller by the controller 940 to irradiate predetermined infrared rays, when the user photographs a bill in order to identify if bill is counterfeit.

Further, the portable terminal 900 may also include a communication device, which receives and updates the denomination database, the genuine bill database, and/or the counterfeit bill database.

Figure 10:
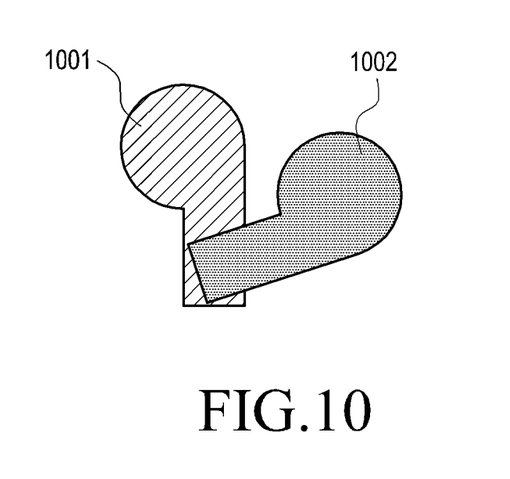
FIG. 10 is a conceptual diagram illustrating a filter according to an embodiment of the present invention.

FIG. 10 is a conceptual diagram illustrating a filter according to an embodiment of the present invention.

Referring to FIG. 10, the filter 910 includes a visible ray cut filter 1001 and an infrared ray cut filter 1002. The visible ray cut filter 1001 and the infrared ray cut filter 1002 limits light incident to the camera 920 under the control of the controller 940.

According to the various embodiments of the present invention, a method for identifying a counterfeit bill, which suppresses influences from a photographing motion or a neighboring environment of the user, and a portable terminal for identifying a counterfeit bill are provided. The method and portable terminal for identifying a counterfeit bill correct a photographed image by first determining a denomination of the bill using an image photographed using visible rays, in order to quickly correct the photographed image of the bill.

Further, according to the easy portability of the portable terminal, the user may easily identify a counterfeit bill without limitation of a space and a time. Further, the counterfeit bill database and the genuine bill database may be frequently updated according to the characteristic of the portable terminal, so that the identification of a counterfeit bill of a desired country may be performed through an additional update of the denomination database for each country, as well as the enhancement of the reliability.

While the present invention has been shown and described with reference to certain embodiments and drawings thereof, it will be understood by those skilled in the art that various changes of the embodiments of the present invention may be made therein without departing from the spirit and scope of the invention as defined by the appended claims and their equivalents.

What is claimed is:

1. A method for identifying a counterfeit bill by a portable terminal, comprising:
  receiving, by the portable terminal, an image of a bill photographed using visible rays and an image of the bill photographed using infrared rays;
  determining a denomination of the bill by comparing the image photographed using the visible rays with a denomination database;
  obtaining correction information for making the image photographed using the visible rays correspond to a corresponding bill image in the denomination database;
  forming a corrected image by correcting the image photographed using the infrared rays using the correction information;
  binary-coding the corrected image; and
  determining whether the bill is counterfeit by comparing the binary-coded corrected image with an image of the corresponding bill pre-stored in a genuine bill database.

2. The method of claim 1, wherein determining whether the bill is counterfeit comprises overlapping the binary-coded corrected image and the image of the corresponding bill in the genuine bill database.

3. The method of claim 1, wherein the correction information makes a shape of the image photographed using the visible rays match a shape of the corresponding bill image in the denomination database.

4. The method of claim 1, wherein determining the denomination of the bill comprises:
   extracting a bill characteristic from the image photographed using the visible rays; and
   comparing the extracted bill characteristic with a bill characteristic of the denomination database.

5. The method of claim 4, wherein the bill characteristic includes at least one of a corner point, an edge, and a blob included in the bill.

6. The method of claim 1, wherein forming the binary-coded corrected image comprises extracting size values through a Sobel edge detection method.

7. The method of claim 6, wherein forming the binary-coded corrected image further comprises:
   determining a characteristic value such that a distribution value in a histogram of the size values determined through the Sobel edge detection method has a maximum value; and
   forming the binary-coded corrected image using the characteristic value.

8. The method of claim 1, wherein the correction information is based on a result of a homography operation between a bill characteristic of the image photographed using the visible rays and a bill characteristic of the corresponding bill image in the denomination database.

9. The method of claim 8, wherein the result of the homography operation includes a homography matrix for performing at least one of enlargement, reduction, rotation, affine, and perspective of the image photographed using the visible rays.

10. A portable terminal for identifying a counterfeit bill, the portable terminal comprising:
   a camera for receiving an image of a bill photographed using visible rays and an image of the bill photographed using infrared rays;
   a memory for storing a denomination database and a genuine bill database for the bill; and
   a controller for determining a denomination of the bill by comparing the image photographed using the visible rays with a denomination database, obtaining correction information for making the image photographed using the visible rays correspond to a corresponding bill image in the denomination database, forming a corrected image by correcting the image photographed using the infrared rays using the correction information, binary-coding the corrected image, and determining whether the bill is counterfeit by comparing the binary-coded corrected image with an image of the corresponding bill stored in the genuine bill database.

11. The portable terminal of claim 10, wherein the controller determines whether the bill is counterfeit by overlapping the binary-coded corrected image and the image of the corresponding bill in the genuine bill database.

12. The portable terminal of claim 10, further comprising a communication unit,
   wherein the controller updates the genuine bill database using information received through the communication unit.

13. The portable terminal of claim 10, wherein the correction information makes a shape of the image photographed using the visible rays match a shape of the corresponding bill image in the denomination database.

14. The portable terminal of claim 10, wherein the controller extracts a bill characteristic from the image photographed using the visible rays, and determines the denomination of the bill by comparing the extracted bill characteristic with a bill characteristic of the denomination database.

15. The portable terminal of claim 14, wherein the bill characteristic comprises at least one of a corner point, an edge, and a blob included in the bill.

16. The portable terminal of claim 10, wherein the controller forms the binary-coded corrected image by extracting size values through a Sobel edge detection method.

17. The portable terminal of claim 16, wherein the controller determines a characteristic value such that a distribution value in a histogram of the size values determined through the Sobel edge detection method has a maximum value, and forms the binary-coded corrected image using the characteristic value.

18. The portable terminal of claim 10, wherein the controller obtains the correction information based on a result of a homography operation between a bill characteristic of the image photographed using the visible rays and a bill characteristic of the denomination database.

19. The portable terminal of claim 18, wherein the result of the homography operation comprises a homography matrix for performing at least one of enlargement, reduction, rotation, affine, and perspective of the image photographed using the visible rays.

20. The portable terminal of claim 10, further comprising a filter including a visible ray cut filter and an infrared ray cut filter,
   wherein the visible ray cut filter and the infrared ray cut filter sequentially limit light input to the camera.

* * * * *